United States Patent
Mishra et al.

(10) Patent No.: US 6,777,867 B2
(45) Date of Patent: Aug. 17, 2004

(54) HIGHLY LOADED FLUORESCENT LAMP

(75) Inventors: Kailiah Mishra, N. Chelmsford, MA (US); Madis Raukas, Boston, MA (US); Cathy M Shaw Trumble, Newburyport, MA (US)

(73) Assignee: Osram Sylvania Inc., Danvers, MA (US)

( * ) Notice: Subject to any disclaimer, the term of this patent is extended or adjusted under 35 U.S.C. 154(b) by 41 days.

(21) Appl. No.: 10/344,103

(22) PCT Filed: Aug. 9, 2001

(86) PCT No.: PCT/US01/24990

§ 371 (c)(1),
(2), (4) Date: Feb. 10, 2003

(87) PCT Pub. No.: WO02/15226

PCT Pub. Date: Feb. 21, 2002

(65) Prior Publication Data

US 2004/0135486 A1 Jul. 15, 2004

Related U.S. Application Data

(60) Provisional application No. 60/224,475, filed on Aug. 10, 2000.

(51) Int. Cl.[7] .................................................. H01J 1/62
(52) U.S. Cl. ........................ 313/487; 313/486; 313/485; 313/484
(58) Field of Search ................................ 313/484, 485, 313/486, 487, 635

(56) References Cited

U.S. PATENT DOCUMENTS

| 5,105,122 A | 4/1992 | Konings et al. |
| 5,350,971 A | 9/1994 | Jeong |
| 5,604,396 A | 2/1997 | Watanabe et al. |
| 5,834,905 A | 11/1998 | Godyak et al. |
| 5,859,496 A | 1/1999 | Murazaki et al. |

FOREIGN PATENT DOCUMENTS

JP 63-37459 4/1980

*Primary Examiner*—Vip Patel
(74) *Attorney, Agent, or Firm*—Carlo S. Bessone

(57) ABSTRACT

A highly loaded fluorescent lamp (10) (FIG. 1) comprises a hollow, translucent glass body (12) containing a medium capable of generating at least several wavelengths of UV radiation. A plurality of phosphors is disposed on the inside surface of the glass body (12), the plurality of phosphors visible radiation upon exposure to the UV radiation. At least one of the plurality of phosphors is subject to degradation upon lone-term exposure to one of the at least one of several wavelengths of UV radiation. The at least one of the plurality of phosphors subject to degradation is installed (FIG. 12) adjacent the inside surface (14) of the glass body (12) to form a first layer (16); and the remainder of the plurality of phosphors is disposed on the first layer to form a second layer (18), the second layer not being subject to long-term degradation upon exposure to the UV radiation.

6 Claims, 1 Drawing Sheet

HIGHLY LOADED FLUORESCENT LAMP

This application claims priority from Provisional Patent Application No. 60/224,475, filed Aug. 10, 2000.

TECHNICAL FIELD

This invention relates to fluorescent lamps and more particularly to highly loaded electrodeless fluorescent lamps. By highly loaded is meant lamps having a discharge current of equal to or greater than 2 amperes.

BACKGROUND ART

Electrodeless lamps, such as those shown in U.S. Pat. No. 5,834,905, employ a hollow glass envelope containing mercury vapor and a buffer gas and having a phosphor coating on the inside surface of the glass body. The phosphor is a substantially homogeneous mixture of usually three materials having emission spectra in different parts of the visible spectrum and blended to emit white light. In preferred forms of this lamp the blend includes three phosphors, namely, red emitting $Y_2O_3:Eu^{3+}$, green emitting $LaPO_4:Ce^{3+},Tb^{3+}$ and blue emitting $BaMgAl_{10}O_{17}:Eu^{2+}$. These lamps are designed for extremely long life, i.e., in the neighborhood of 100,000 hours. The long life of these lamps has given rise to problems involving a color shift in the emitted spectra. It has been determined that this color shift is caused by degradation of some of the lamp phosphors during life, the degradation probably being caused by the long exposure to at least one of several wavelengths of ultraviolet radiation generated during operation of the lamp.

DISCLOSURE OF INVENTION

It is, therefore, an object of the invention to obviate the disadvantages of the prior art and to improve the performance and consistent color output of such lamps.

These objects are accomplished, in one aspect of the invention, by the provision of a highly loaded fluorescent lamp comprising a hollow, translucent glass body containing a medium capable of generating at least several wavelengths of UV radiation. A plurality of phosphors is disposed on the inside surface of the glass body, the plurality of phosphors emitting visible radiation upon exposure to the UV radiation. At least one of the plurality of phosphors is subject to degradation upon long-term exposure to one of the at least one of several wavelengths of UV radiation. The at least one of the plurality of phosphors subject to degradation is installed adjacent the inside surface of the glass body to form a first layer; and, the remainder of the plurality of phosphors are disposed on the first layer to form a second layer, the second layer not being subject to long-term degradation upon exposure to the UV radiation.

The deposition of the more stable phosphor on top of the least stable phosphor provides adequate protection of the least stable phosphor during the life of the lamp, allowing the lamp to more nearly provide its designed color output during its long life.

BEST MODE FOR CARRYING OUT THE INVENTION

For a better understanding of the present invention, together with other and further objects, advantages and capabilities thereof, reference is made to the following disclosure and appended claims in conjunction with the above-described drawings.

Figure 1:
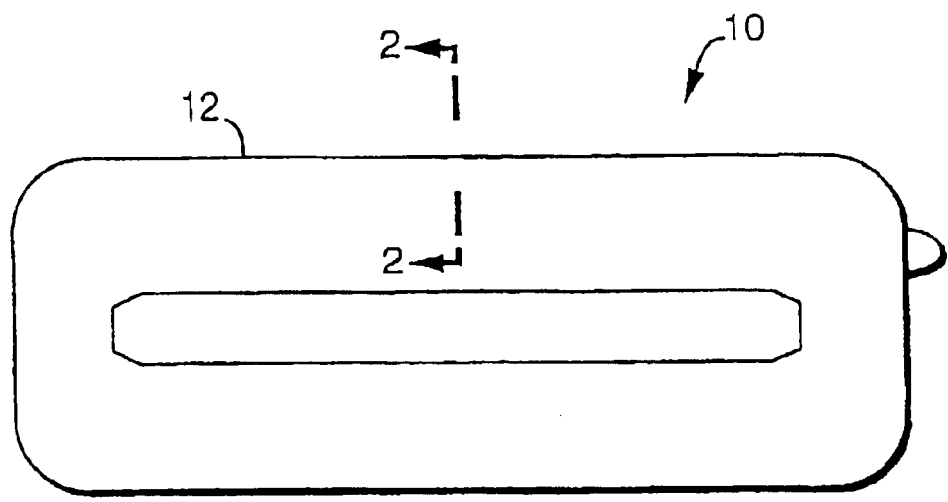
FIG. 1 is a diagrammatic plan view of an electrodeless fluorescent lamp employing the invention.

Referring now to the drawings with greater particularity, there is shown in FIG. 1 a highly loaded electrodeless fluorescent lamp 10 with its external power sources omitted. The lamp 10 has a hollow glass body 12 which contains a medium capable of generating at least several wavelengths of ultraviolet radiation. The medium can comprise mercury vapor and a buffer gas, usually a noble gas such as krypton; however, argon or other equivalent gases can be used.

Additionally, the inside surface 14 of body 12 of prior art lamps has been coated with a substantially homogeneous blend of three phosphors whose blended red, green and blue emission provides a balanced white light output. Emission from the phosphors is stimulated by exposure to the ultraviolet radiation, particularly at 185 nm and 254 nm, which is provided during lamp operation by the mercury vapor. In a preferred embodiment of this invention, the red emitting phosphor is $Y_2O_3:Eu^{3+}$ (hereinafter, YOE) the green emitting phosphor is $LaPO_4:Ce^{3+},Tb^{3+}$ (hereinafter, LAP) and the blue emitting phosphor is $BaMgAl_{10}O_{17}:Eu^{2+}$ (hereinafter, BAM).

As above noted, it has been discovered that during the long lifetime of these lamps, an undesirable color shift can occur. It is believed that this color shift is caused by a degradation of the blue emitting phosphor due to long exposure to particularly the 185 nm radiation. Ion bombardment is also suspected of being another cause. Additionally, oxidation of the $Eu^{2+}$ could be occurring during lamp processing.

The color shift problem of these highly loaded lamps can be eliminated or substantially reduced by applying the phosphors in layers with the blue BAM phosphor being applied first and a blend of the LAP and YOE phosphors being applied over it. This is particularly applicable since the YOE is a very stable material and attenuates the UV radiation thus reaching the BAM.

Figure 2:
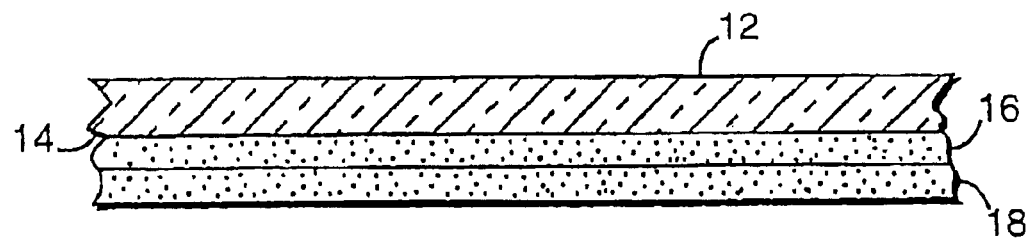
FIG. 2 is a cross-section taken along the line 2—2 of FIG. 1.

This embodiment is shown in FIG. 2 wherein the inside surface 14 of body 12 has applied thereto a first layer 16 of a BAM phosphor and has applied over it a second layer 18 of a blend of LAP and YOE phosphors.

Alternatively, the BAM and LAP phosphors can be blended and applied together to form the first coat and can be overcoated with the YOE. The band gap of LAP is greater than 170 nm and that of the YOE is ~210 nm. Thus absorption of the 185 nm radiation by the YOE is most likely accomplished by excitation of electrons in the host lattice. In the case of the LAP, it is most likely accomplished by impurity excitation. Since the absorption strength of the host excitation is one or two orders of magnitude higher than that of the impurity related absorption, the YOE would be a better absorber of 185 nm radiation than LAP, indicating that this latter approach may be the most efficient.

While there have been shown and described what are at present considered to be the preferred embodiments of the invention, it will be apparent to those skilled in the art that various changes and modification can be made herein without departing from the scope of the invention as defined by the appended claims.

What is claimed is:

1. A highly loaded fluorescent lamp comprising:
    a hollow, translucent glass body containing a medium capable of generating at least several wavelengths of UV radiation;
    a plurality of phosphors disposed on the inside surface of said glass body, said phosphors emitting visible radiation upon exposure to said UV radiation, at least one of said plurality of phosphors being subject to degradation upon long-term exposure to one of said at least one of several wavelengths of UV radiation;
    said at least one of said plurality of phosphors subject to degradation being installed adjacent said inside surface of said glass body to form a first layer; and
    the remainder of said plurality of phosphors being disposed on said first layer to form a second layer, said second layer not being subject to long-term degradation upon exposure to said UV radiation.

2. The lamp of claim 1 wherein said fluorescent lamp is an electrodeless lamp.

3. The lamp of claim 2 wherein said plurality of phosphors comprises individual phosphors emitting in the red, green and blue portions of the visible spectrum.

4. The lamp of claim 3 wherein said blue emitting phosphor is $BaMgAl_{10}O_{17}:Eu^{2+}$.

5. The lamp of claim 4 wherein said $BaMgAl_{10}O_{17}:EU^{2+}$ is the phosphor subject to degradation.

6. The lamp of claim 5 wherein said remainder of said phosphors comprise $Y_2O_3:Eu^{3+}$ and $LaPO_4:Ce^{3+},Tb^{3+}$.

* * * * *